US012671033B2

(12) United States Patent
Hong et al.

(10) Patent No.: US 12,671,033 B2
(45) Date of Patent: Jun. 30, 2026

(54) DIELECTRIC COMPOSITION FOR MULTILAYERED CERAMIC CAPACITOR, MULTILAYERED CERAMIC CAPACITOR COMPRISING SAME, AND MANUFACTURING METHOD FOR CAPACITOR

(71) Applicant: AMOTECH CO., LTD., Incheon (KR)

(72) Inventors: Sung Jin Hong, Incheon (KR); Jae Woo Choi, Incheon (KR); Seong Un Ma, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 453 days.

(21) Appl. No.: 18/561,336

(22) PCT Filed: Apr. 27, 2022

(86) PCT No.: PCT/KR2022/006026
§ 371 (c)(1),
(2) Date: Nov. 16, 2023

(87) PCT Pub. No.: WO2022/245005
PCT Pub. Date: Nov. 24, 2022

(65) Prior Publication Data
US 2024/0249884 A1 Jul. 25, 2024

(30) Foreign Application Priority Data
May 20, 2021 (KR) ........................ 10-2021-0064586

(51) Int. Cl.
*H01G 4/12* (2006.01)
*H01G 4/232* (2006.01)
*H01G 4/30* (2006.01)

(52) U.S. Cl.
CPC ........... *H01G 4/1245* (2013.01); *H01G 4/232* (2013.01); *H01G 4/30* (2013.01)

(58) Field of Classification Search
CPC ..... C04B 35/468; C04B 35/48; C04B 35/622; C04B 2235/3227; C04B 2235/3262; C04B 2235/442; C04B 2235/5445; C04B 2235/5463; C04B 2235/96; C04B 35/634; C04B 35/63416; C04B 35/6342;
(Continued)

(56) References Cited

U.S. PATENT DOCUMENTS

2007/0254799 A1* 11/2007 Kaneda .................... H01G 4/30
501/139
2011/0164346 A1 7/2011 Tamura et al.

FOREIGN PATENT DOCUMENTS

JP H11322414 A 11/1999
JP 2008179492 A 8/2008
(Continued)

*Primary Examiner* — Shuangyi Abu Ali
(74) *Attorney, Agent, or Firm* — Bayramoglu Law Offices LLC

(57) ABSTRACT

A dielectric composition for a multilayered ceramic capacitor is provided, the multilayered ceramic capacitor includes the same, and a manufacturing method for the capacitor is also provided. The dielectric composition for a multilayered ceramic capacitor includes a barium-based compound, gadolinium oxide ($Gd_2O_3$), manganese oxide ($Mn_3O_4$), and magnesium carbonate ($MgCO_3$). Accordingly, the dielectric composition is excellent in performance as well as reliability.

6 Claims, 7 Drawing Sheets

(58) Field of Classification Search
CPC .. C04B 35/636; C04B 35/6365; H01G 4/012;
H01G 4/1227; H01G 4/1245; H01G
4/232; H01G 4/30; H01G 4/12
See application file for complete search history.

(56)                    References Cited

FOREIGN PATENT DOCUMENTS

| | | | |
|---|---|---|---|
| JP | 2008179493 | A | 8/2008 |
| JP | 2009143735 | A | 7/2009 |
| JP | 2009184841 | A | 8/2009 |
| JP | 2011116629 | A | 6/2011 |
| JP | 2011136894 | A | 7/2011 |
| JP | 2013193955 | A | 9/2013 |
| JP | 2019087522 | A | 6/2019 |
| JP | 2021020830 | A | 2/2021 |
| KR | 20010090883 | A | 10/2001 |
| KR | 20090061592 | A | 6/2009 |
| KR | 20110050390 | A | 5/2011 |
| KR | 20130106569 | A | 9/2013 |
| KR | 20180038429 | A | 4/2018 |

* cited by examiner

DIELECTRIC COMPOSITION FOR MULTILAYERED CERAMIC CAPACITOR, MULTILAYERED CERAMIC CAPACITOR COMPRISING SAME, AND MANUFACTURING METHOD FOR CAPACITOR

CROSS REFERENCE TO THE RELATED APPLICATIONS

This application is the national phase entry of International Application No. PCT/KR2022/006026, filed on Apr. 27, 2022, which is based upon and claims priority to Korean Patent Application No. 10-2021-0064586, filed on May 20, 2021, the entire contents of which are incorporated herein by reference.

TECHNICAL FIELD

The present invention relates to a dielectric composition for a multilayered ceramic capacitor, a multilayered ceramic capacitor including the same and a manufacturing method thereof, and more specifically to a dielectric composition for a multilayered ceramic capacitor having excellent reliability and performance, a multilayered ceramic capacitor including the same and a manufacturing method thereof.

BACKGROUND

The electronic part using a ceramic material such as a capacitor, inductor, piezoelectric element, varistor or thermistor is provided with a ceramic body which is made of ceramic material, internal electrodes which are formed inside the body and external electrodes which are installed on the surface of the ceramic body to be connected to the internal electrodes.

Among ceramic electronic parts, a multilayered ceramic capacitor includes a plurality of stacked dielectric layers, internal electrodes which are disposed to face each other with one dielectric layer interposed therebetween, and external electrodes which are electrically connected to the internal electrodes.

Multilayered ceramic capacitors are typically manufactured by laminating paste for internal electrodes and paste for dielectric layers by the sheet method or the printing method and simultaneously sintering the same.

The dielectric material used in conventional multilayered ceramic high-capacity capacitors is a ferroelectric material based on barium titanate ($BaTiO_3$), and it has a high dielectric constant at room temperature, a relatively small dissipation factor and excellent insulation resistance characteristics.

However, as the electronic control of automobiles evolves, the demand for the performance and reliability of electronic parts using ceramic materials is increasing, and the dielectric material based on barium titanate ($BaTiO_3$), which has been used previously, had problems in that not only the reliability of evolving electronic parts cannot be guaranteed, but also excellent performance is also not guaranteed.

In addition, there is a problem in that not only the reliability of evolving electronic prats is not guaranteed, but also excellent performance is not guaranteed in the existing method of manufacturing a general multilayer ceramic high-capacity capacitor.

SUMMARY

Technical Problem

The present invention has been devised in consideration of the above points, and an object of the present invention is to provide a dielectric composition for a multilayered ceramic capacitor having excellent lifespan reliability, a multilayered ceramic capacitor including the same and a manufacturing method thereof.

In addition, another object of the present invention is to provide a dielectric composition for a multilayered ceramic capacitor having not only low equivalent series resistance and leakage current but also high quality factor and DC insulation resistance, a multilayered ceramic capacitor including the same and a manufacturing method thereof.

Technical Solution

In order to solve the above-described problems, the present invention provides a dielectric composition for a multilayered ceramic capacitor, including a barium-based compound, gadolinium oxide ($Gd_2O_3$), manganese oxide ($Mn_3O_4$) and magnesium carbonate ($MgCO_3$).

In addition, the barium-based compound may include barium zirconate ($BaZrO_3$) and barium titanate ($BaTiO_3$).

In addition, the barium-based compound may include barium zirconate ($BaZrO_3$) and barium titanate ($BaTiO_3$) at a molar ratio of 1:2 to 6.

In addition, the dielectric composition may include 2 to 6 mole parts of gadolinium oxide ($Gd_2O_3$), 0.01 to 1 mole part of manganese oxide ($Mn_3O_4$) powder and 2 to 6 mole parts of magnesium carbonate ($MgCO_3$), based on 100 mole parts of a barium-based compound.

In addition, the dielectric composition may satisfy Conditions (1) to (3) below:

$$D10 \leq 60\,nm \tag{1}$$

$$150\ nm \leq D50 \leq 350\ nm \tag{2}$$

$$D90 \leq 2,000\ nm \tag{3}$$

wherein in Conditions (1) to (3) above, D10, D50 and D90 refer to particle sizes corresponding to 10%, 50% and 90% of the maximum value in the volumetric distribution of the dielectric composition particle size, respectively.

Meanwhile, the present invention provides a multilayered ceramic capacitor, including a capacitor body in which a ceramic body and internal electrodes are alternately stacked; and external electrode which are formed on the outer surface of the capacitor body and electrically connected to the internal electrodes.

Additionally, in the ceramic body, the dielectric composition of the present invention may be sintered.

Furthermore, the present invention provides a method for manufacturing a multilayered ceramic capacitor, including a first step of preparing a dielectric composition for a multilayered ceramic capacitor; a second step of preparing a ceramic slurry by mixing the dielectric composition with a binder and an organic solvent; a third step of forming a ceramic green sheet by casting the ceramic slurry; a fourth step of manufacturing a green chip by printing internal electrodes on one surface of the ceramic green sheet and stacking a plurality of the same; a fifth step of manufacturing a capacitor body by performing a debinding process and a sintering process on the green chip; and a sixth step of manufacturing a multilayered ceramic capacitor by printing external electrodes that are electrically connected to the internal electrodes on the external surface of the capacitor body.

In addition, the dielectric composition for the multilayered ceramic capacitor may be a mixture of a barium-based compound, gadolinium oxide ($Gd_2O_3$), manganese oxide ($Mn_3O_4$) and magnesium carbonate ($MgCO_3$).

In addition, the barium-based compound may be a mixture of a barium zirconate ($BaZrO_3$) and barium titanate ($BaTiO_3$) at a molar ratio of 1:2 to 6.

In addition, the dielectric composition may be a mixture of 2 to 6 mole parts of gadolinium oxide ($Gd_2O_3$), 0.01 to 1 mole part of manganese oxide ($Mn_3O_4$) powder and 2 to 6 mole parts of magnesium carbonate ($MgCO_3$), based on 100 mole parts of the barium-based compound.

Further, in the second step of the method for manufacturing a multilayered ceramic capacitor, the dielectric composition may be mixed with a binder and an organic solvent, pulverized and then subjected to a defoamation process and an aging process to prepare a ceramic slurry that satisfies Conditions (1) to (3) below and has a viscosity of 100 to 500 cps:

$$D10 \le 60 \text{ nm} \tag{1}$$

$$150 \text{ nm} \le D50 \le 350 \text{ nm} \tag{2}$$

$$D90 \le 2,000 \text{ nm} \tag{3}$$

wherein in Conditions (1) to (3) above, D10, D50 and D90 refer to particle sizes corresponding to 10%, 50% and 90% of the maximum value in the volumetric distribution of the dielectric composition particle size, respectively.

In addition, the binder may include at least one selected from polyvinyl butyral, ethyl cellulose, polyvinyl alcohol and acryl.

Advantageous Effects

According to the dielectric composition for a multilayered ceramic capacitor according to the present invention, the multilayered ceramic capacitor including the same and the manufacturing method thereof, the reliability for lifespan is excellent, the equivalent series resistance and leakage current are low, and the quality factor and DC insulation resistance are high.

DETAILED DESCRIPTION OF THE EMBODIMENTS

Figure 1:
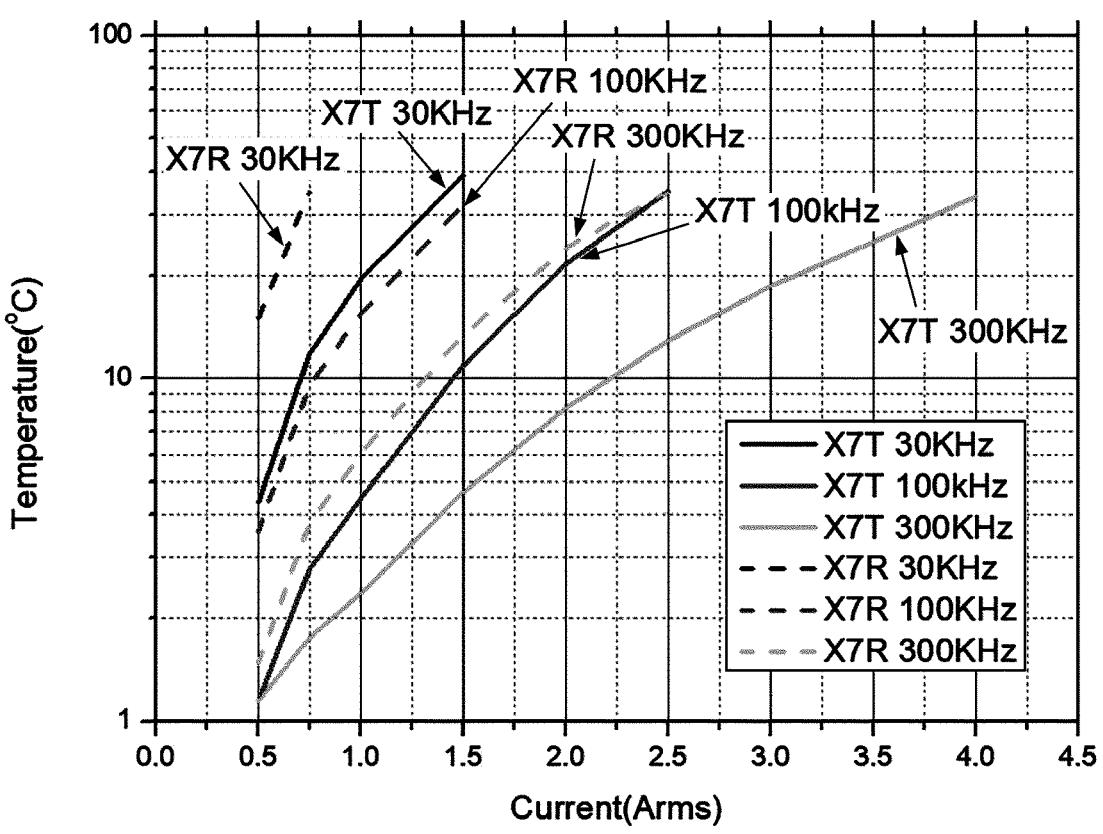
FIG. 1 is a graph showing the temperature versus ripple current at frequencies of 30 kHz, 100 kHz and 300 kHz for a multilayered ceramic capacitor manufactured in Example 1 and Murata's multilayered ceramic capacitor X7R, respectively.

Hereinafter, with reference to the accompanying drawings, the exemplary embodiments of the present invention will be described in detail so that those skilled in the art can easily practice the present invention. The present invention may be embodied in many different forms and is not limited to the exemplary embodiments set forth herein. In order to clearly describe the present invention in the drawings, parts that are irrelevant to the description are omitted, and the same reference numerals are added to the same or similar components throughout the specification.

Figure 7:
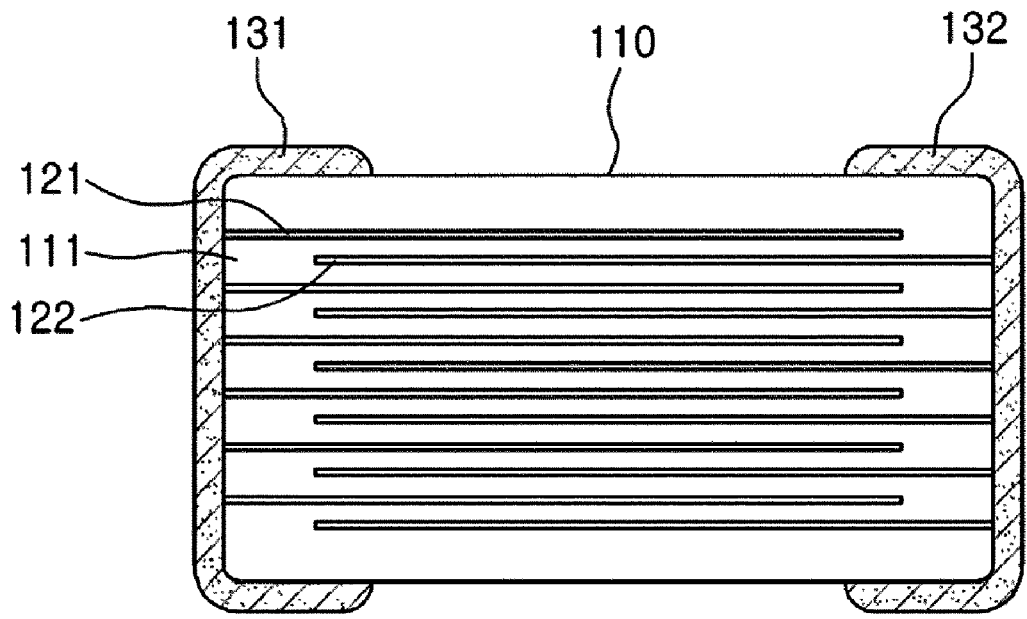
FIG. 7 is a cross-sectional view showing the detailed configuration of a multilayered ceramic capacitor according to an exemplary embodiment of the present invention.

As illustrated in FIG. 7, the multilayered ceramic capacitor according to an exemplary embodiment of the present invention may include a capacitor body 110 in which a ceramic body 111 and internal electrodes 121, 122 are alternately stacked, and external electrodes 131, 132 which are electrically connected to the internal electrodes 121, 122. In other words, on the outer surface or both ends of the capacitor body 110, first and second internal electrodes 121, 122 may be formed to conductive with, in other words, to be electrically connected to first and second internal electrodes 121, 122, which are alternately disposed inside the capacitor body 110, respectively.

The shape of the capacitor body 110 is not particularly limited, but may generally be a hexahedral shape. In addition, the dimensions thereof are not particularly limited, and may be designed to appropriate dimensions depending on the usage. As an example, it may be designed to have dimensions of 0.5 to 8.0 mm in length, 0.5 to 8.0 mm in width, and 0.2 to 5.0 mm in thickness.

The thickness of the ceramic body 111 may be arbitrarily changed according to the capacity design of the multilayered ceramic capacitor, and in an exemplary embodiment of the present invention, the thickness of the ceramic body 111 may be 5 to 100 μm per sheet, and preferably, 15 to 50 μm. The thickness of the ceramic body 111 may be 5 μm or more, because the ceramic body 111 having a too thin thickness has a small number of crystal grains that are present in one sheet and adversely affects reliability.

The internal electrodes 121, 122 may be stacked such that each cross-section is exposed to opposite ends of the capacitor body 110.

The external electrodes 131, 132 are formed at both ends of the capacitor body 110 and are electrically connected to exposed end surfaces of the internal electrodes 121, 122 to form a capacitor circuit.

The conductive material contained in the internal electrodes 121, 122 is not particularly limited, but may preferably include nickel (Ni) as a main component.

The thickness of the internal electrodes 121, 122 may be appropriately designed according to the purpose and the like, and in an exemplary embodiment of the present invention, the thickness of the internal electrodes 121, 122 may be 0.1 to 50 μm, and preferably, 0.1 to 10 μm.

The conductive material contained in the external electrodes 131, 132 is not particularly limited, but may include nickel (Ni), copper (Cu) or an alloy thereof as a main component.

Meanwhile, the ceramic body 111 may be formed by sintering a dielectric composition for a multilayered ceramic capacitor according to the present invention, which will be described below.

The dielectric composition for a multilayered ceramic capacitor according to an exemplary embodiment of the present invention may include at least one selected from a barium-based compound, gadolinium oxide ($Gd_2O_3$), manganese oxide ($Mn_3O_4$) and magnesium carbonate ($MgCO_3$), and may preferably include a barium-based compound, gadolinium oxide ($Gd_2O_3$), manganese oxide ($Mn_3O_4$) and magnesium carbonate ($MgCO_3$).

Specifically, the dielectric composition for a multilayered ceramic capacitor of the present invention may include 2 to 6 mole parts of gadolinium oxide, preferably, 3 to 5 mole parts, and more preferably, 3.5 to 4.5 mole parts, based on 100 mole parts of the barium-based compound, and if gadolinium oxide is included in an amount of less than 2 mole parts, there may be a problem in that characteristics such as temperature and DC bias are lowered, and if it is included in an amount of more than 6 mole parts, there may be a problem in that the dielectric composition is not sintered.

In addition, the dielectric composition for a multilayered ceramic capacitor of the present invention may include 0.01 to 1 mole part of manganese oxide, preferably, 0.05 to 0.5 mole parts, and more preferably, 0.07 to 0.13 mole parts, based on 100 mole parts of the barium-based compound, and if the manganese oxide is included in an amount of less than 0.01 mole part, there may be a problem in that reliability is deteriorated, and if it is included in an amount of more than 1 mole part, there may be a problem in that characteristics are deteriorated.

In addition, the dielectric composition for a multilayered ceramic capacitor of the present invention may include 2 to 6 mole parts of magnesium carbonate, preferably, 3 to 5 mole parts, and more preferably, 3.5 to 4.5 mole parts, based on 100 mole parts of the barium-based compound, and if magnesium carbonate is included in an amount of less than 2 mole parts, there may be a problem in that temperature characteristics are unsatisfactory, and if it is included in amount of more than 6 mole parts, there may be a problem in that the dielectric constant of a sintered body is reduced.

Meanwhile, the barium-based compound may include at least one selected from barium zirconate ($BaZrO_3$) and barium titanate ($BaTiO_3$), and may preferably include barium zirconate ($BaZrO_3$) and barium titanate ($BaTiO_3$).

In this case, the barium-based compound may include barium zirconate ($BaZrO_3$) and barium titanate ($BaTiO_3$) at a molar ratio of 1:2 to 6, preferably, at a molar ratio of 1:3 to 5, and more preferably, at a molar ratio of 1:3.5 to 4.5, and if the molar ratio is less than 1:2, there may be a problem in that the sintered body is not fired, and if it exceeds 1:6, there may be a problem in that characteristics such as temperature and DC bias are lowered.

Furthermore, the dielectric composition for a multilayered ceramic capacitor of the present invention may satisfy Conditions (1) to (3) below, and if Conditions (1) to (3) below are not satisfied, there may be a problem in that it is difficult to secure a uniform grain size after sintering:

(1) D10≤60 nm, preferably, 1 nm≤D10≤50 nm, more preferably, 3 nm≤D10≤50 nm (2) 150 nm≤D50≤350 nm, preferably, 200 nm≤D50≤300 nm, more preferably, 220 nm≤D50≤280 nm (3) D90≤2,000 nm, preferably, 500 nm≤D90≤1,500 nm, more preferably, 700 nm≤D90≤1,000 nm In Conditions (1) to (3) above, D10, D50 and D90 refer to particle sizes corresponding to 10%, 50%, and 90% of the maximum value in the cumulative volume distribution of the particle size of the dielectric composition for a multilayered ceramic capacitor according to the present invention, respectively.

The method for manufacturing a multilayered ceramic capacitor according to an exemplary embodiment of the present invention includes first to sixth steps.

First of all, the first step of the method for manufacturing a multilayered ceramic capacitor according to an exemplary embodiment of the present invention may prepare a dielectric composition for a multilayered ceramic capacitor. The prepared dielectric composition for a multilayered ceramic capacitor may be a mixture of at least one selected from a barium-based compound, gadolinium oxide ($Gd_2O_3$), manganese oxide ($Mn_3O_4$) and magnesium carbonate ($MgCO_3$), and preferably may be a mixture of a barium-based compound, gadolinium oxide ($Gd_2O_3$), manganese oxide ($Mn_3O_4$) and magnesium carbonate ($MgCO_3$). Specifically, the dielectric composition for a multilayered ceramic capacitor of the present invention may be a mixture of 0.01 to 1 mole part of manganese oxide, preferably, 0.05 to 0.5 mole part, and more preferably, 0.07 to 0.13 mole parts, 2 to 6 mole parts of magnesium carbonate, preferably, 3 to 5 mole parts, and more preferably, 3.5 to 4.5 mole parts, and 2 to 6 mole parts of gadolinium oxide, preferably, 3 to 5 mole parts, and more preferably, 3.5 to 4.5 mole prats, based on 100 mole parts of the barium-based compound. In addition, the barium-based compound may be a mixture of barium zirconate ($BaZrO_3$) and barium titanate ($BaTiO_3$), and preferably, barium zirconate ($BaZrO_3$) and barium titanate ($BaTiO_3$) may be mixed at a molar ratio of 1:2 to 6, preferably, at a molar ratio of 1:3 to 5, and more preferably, at a molar ratio of 1:3.5 to 4.5.

Next, the second step of the method for manufacturing a multilayered ceramic capacitor according to an exemplary embodiment of the present invention may prepare a ceramic slurry by mixing a binder and an organic solvent with the dielectric composition for a multilayered ceramic capacitor prepared in the first step.

Specifically, the second step of the method for manufacturing a multilayered ceramic capacitor according to an exemplary embodiment of the present invention may prepare a ceramic slurry that satisfies Conditions (1) to (3) below and has a viscosity of 100 to 500 cps, and preferably, 200 to 400 cps by mixing a binder and an organic solvent with the dielectric composition for a multilayered ceramic capacitor prepared in the first step, pulverizing the same, and then performing a defoamation process and an aging process. If the viscosity is less than 100 cps or more than 500 cps, there may be problems following difficulties in the sheet manufacturing process:

(1) D10≤60 nm, preferably, 1 nm≤D10≤50 nm, more preferably, 3 nm≤D10≤50 nm (2) 150 nm≤D50≤350 nm, preferably, 200 nm≤D50≤300 nm, more preferably, 220 nm≤D50≤280 nm (3) D90≤2,000 nm, preferably, 500 nm≤D90≤1,500 nm, more preferably, 700 nm≤D90≤1,000 nm In Conditions (1) to (3) above, D10, D50, and D90 refer to particle sizes corresponding to 10%, 50%, and 90% of the maximum value in the cumulative volume distribution of the particle size of the ceramic slurry, respectively.

The binder used in the second step may include at least one selected from polyvinyl butyral, ethyl cellulose, polyvinyl alcohol and acryl, may preferably include at least one selected from polyvinyl butyral and acryl, and may more preferably include polyvinyl butyral. In addition, the binder used in the second step may be mixed in an amount of 3 to 20 parts by weight, preferably, 6 to 11 parts by weight, and more preferably, 7 to 10 parts by weight, based on 100 parts by weight of the dielectric composition for a multilayered ceramic capacitor prepared in the first step.

The organic solvent used in the second step may be used by including any organic solvent used as an organic solvent in the art, and preferably may include at least one selected from ethanol, toluene, methyl ethyl ketone and xylene. In addition, the organic solvent used in the second step may be mixed in an amount of 45 to 95 parts by weight, preferably, 55 to 85 parts by weight, and more preferably, 65 to 75 parts by weight, based on 100 parts by weight of the dielectric composition for a multilayered ceramic capacitor prepared in the first step.

In addition, the pulverizing in the second step may be performed by any pulverizing process that can be generally performed in the art, and may be performed through ball milling as an example, and for the used ball, 0.1 to 0.5 mm zirconia beads may be used.

Further, in the second step, any defoamation and aging process that can be generally performed in the art may be performed in the defoamation and aging process.

Next, the third step of the method for manufacturing a multilayered ceramic capacitor according to an exemplary embodiment of the present invention may form a ceramic green sheet by casting the ceramic slurry prepared in the second step. Specifically, any casting process that can be generally performed in the art may be performed for casting, and as an example, the ceramic green sheet may be formed by dropping on a PET film and using a comma roll-type casting machine.

Next, the fourth step of the method for manufacturing a multilayered ceramic capacitor according to an exemplary embodiment of the present invention may manufacture a green chip by printing internal electrodes on one surface of the ceramic green sheet formed in the third step and stacking a plurality of the same. In this case, a conductive paste including Ni as a main component may be used as the internal electrode, and any printing process that can be generally performed in the art may be performed, and as an example, screen printing may be performed to print. In addition, the ceramic green sheet may have 5 to 200 layers, preferably, 10 to 100 layers, more preferably, 10 to 60 layers, still more preferably, 20 to 50 layers, and still more preferably 30 to 40 layers.

Additionally, after stacking a plurality of sheets, the green chip may be manufactured after performing hot isostatic press at a temperature of 40 to 120° C., and preferably, 60 to 100° C., and then cut to a predetermined size.

Next, the fifth step of the method for manufacturing a multilayered ceramic capacitor according to an exemplary embodiment of the present invention may manufacture a capacitor body by performing a debinding process and a sintering process on the green chip manufactured in the fourth step. Specifically, in the fourth step, the capacitor body may be manufactured by sequentially performing two debinding processes and one sintering process, and as an example, the capacitor body may be manufactured by performing a primary debinding process for the green chip at a temperature of 200 to 400° C., and preferably, 250 to 350° C. in an oxidizing atmosphere for 60 to 300 minutes, and preferably, 120 to 240 minutes, and then performing a secondary debinding process for 30 to 120 minutes, and preferably, 45 to 90 minutes, at a temperature of 800 to 1,000° C., and preferably, 850 to 950° C. in a nitrogen atmosphere, and sintering the green chip for which the debinding processes have been performed at a temperature of 1,000 to 1,400° C., and preferably, 1,100 to 1,300° C., in a nitrogen-hydrogen mixed gas atmosphere for 60 to 300 minutes, and preferably, 120 to 240 minutes. Debinding may be performed by any debinding process that can be generally performed in the art, and as an example, it may be performed through an atmospheric debinding furnace.

In addition, sintering may be performed in any sintering process that can be generally performed in the art, and it may be performed through a continuous furnace as an example.

Finally, the sixth step of the method for manufacturing a multilayered ceramic capacitor according to an exemplary embodiment of the present invention may manufacture a multilayered ceramic capacitor by printing external electrodes that are electrically connected to the internal electrodes on the outer surface or both ends of the capacitor body manufactured in the fifth step. In this case, as the external electrodes, a conductive paste including Cu as a main component may be used, and any printing process that can be generally performed in the art may be performed, and as an example, the dipping method may be used to print.

Example 1: Manufacture of Multilayered Ceramic Capacitor (1) A dielectric composition for a multilayered ceramic capacitor, in which 4 mole parts of gadolinium oxide ($Gd_2O_3$) powder, 0.1 mole parts of manganese oxide ($Mn_3O_4$) powder and 4 mole parts of magnesium carbonate ($MgCO_3$) were mixed based on 100 mole parts of barium-based compound powder, was prepared. In this case, as the barium-based compound powder, a mixture of barium zirconate ($BaZrO_3$) powder and barium titanate ($BaTiO_3$) powder at a molar ratio of 1:4 was used.

(2) A binder and an organic solvent were mixed with the prepared dielectric composition for a multilayered ceramic capacitor, and ball milling was performed by using 0.2 mm zirconia beads to pulverize, followed by performing a defoamation process and an aging process to prepare a ceramic slurry having a particle size of D10 45 nm, D50 250 nm, D90 900 nm and a viscosity of 300 cps. In this case, polyvinyl butyral was used as a binder, toluene was used as an organic solvent, and D10, D50 and D90 refer to particle sizes corresponding to 10% 50%, and 90% of the maximum value in the volumetric distribution of ceramic slurry particle sizes, respectively.

(3) The prepared ceramic slurry was dropped onto a PET film and formed into a sheet using a comma roll casting machine to manufacture a ceramic green sheet having a thickness of 30 μm.

(4) A conductive paste including Ni used as an internal electrode as a main component was printed on one surface of the manufactured ceramic green sheet by the screen printing method, and then, a plurality of sheets were stacked. Specifically, ceramic green sheets were alternately stacked such that the conductive paste region including Ni as a main component formed a counter electrode, and then, after performing a hot isostatic press at a temperature of 80° C., it was cut into predetermined dimensions, so as to manufacture a green chip. In this case, the ceramic green sheets were stacked in 33 layers, and the area of the counter electrode was 20 mm$^2$.

(5) The manufactured green chip was subjected to a primary debinding process for 120 minutes at a temperature of 300° C. in an oxidizing atmosphere, and a secondary debinding process was performed at a temperature of 900° C. in a nitrogen atmosphere for 60 minutes. The green chip subjected to the debinding process was sintered at a temperature of 1,200° C. for 120 minutes in a nitrogen-hydrogen mixed gas atmosphere to manufacture a capacitor body.

(6) On both end surfaces of the manufactured capacitor body, a conductive paste including Cu used as an external electrode as a main component was printed by the dipping method and baked to manufacture a multilayered ceramic capacitor having external electrodes which are electrically connected to internal electrodes and having external dimensions of 5.7 mm in length, 5.0 mm in width and 2.0 mm in thickness.

Experimental Example: Measurement of Physical Properties of Multilayered Ceramic Capacitors The physical properties of the multilayered ceramic capacitor manufactured in Example 1 and Murata's multilayered ceramic capacitor X7R were measured under the following measurement conditions.

① Input: Function generator

② Amplifier: DC ~1 MHZ, about 3 to 4A, CV Type

③ Output: Oscilloscope, current probes

④ Others: Thermocouple, temperature measurement program

Experimental Example 1: Temperature Measurement for Ripple Current at Frequencies of 30 kHz, 100 kHz and 300 kHz The temperature of the ripple current was measured at frequencies of 30 kHz, 100 kHz and 300 kHz for the multilayered ceramic capacitor (=X7T) manufactured in example 1 and multilayered ceramic capacitor X7R (=it has a composition including 3.9 to 9.0 mole parts of magnesium (Mg), 11.3 to 14.7 mole parts of gadolinium (Gd), 10.3 to 14.1 mole parts of zirconium (Zr), 1.5 to 2.8 mole parts of manganese (Mn), 29.3 to 32.3 mole parts of calcium (Ca) and 4.4 to 8.2 mole parts of silicon, based on 100 mole parts of barium titanate ($BaTiO_3$)) by Murata, respectively, and the measurement values therefrom are shown in Table 1, and the measurement graph is illustrated in FIG. 1. Referring to Table 1 and FIG. 1, it could be confirmed that the multilayered ceramic capacitor manufactured in Example 1 showed a lower temperature than Murata's multilayered ceramic capacitor X7R, and had excellent reliability in terms of lifespan.

TABLE 1

| Classification | | 0.5A | 1.0A | 1.5A | 2.0A | 2.5A | 3.0A | 3.5A | 4.0A |
|---|---|---|---|---|---|---|---|---|---|
| Example 1 | 30 KHz | 4.33 deg C. | 19.35 deg C. | 39.03 deg C. | — | — | — | — | — |
| | 100 KHz | 1.14 deg C. | 4.455 deg C. | 10.875 deg C. | 21.42 deg C. | 35.195 deg C. | — | — | — |
| | 300 KHz | 1.14 deg C. | 2.36 deg C. | 4.65 deg C. | 8.21 deg C. | 12.86 deg C. | 18.57 deg C. | 25.08 deg C. | 33.845 deg C. |
| X7R | 30 KHz | 15.19 deg C. | 61.47 deg C. | — | — | — | — | — | — |
| | 100 KHz | 3.56 deg C. | 9.51 deg C. | 15.46 deg C. | 32.06 deg C. | — | — | — | — |
| | 300 KHz | 1.47 deg C. | 3.75 deg C. | 6.03 deg C. | 13.37 deg C. | 24.04 deg C. | 35.00 deg C. | — | — |

Figure 2:
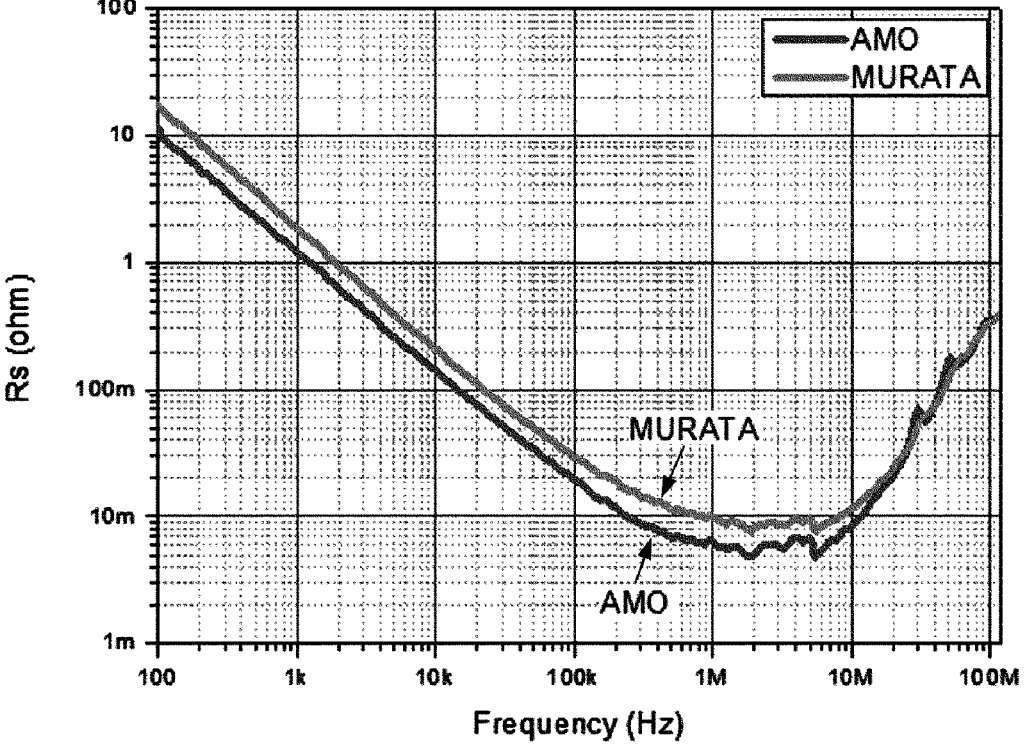
FIG. 2 is a graph showing the equivalent series resistance versus frequency for the multilayered ceramic capacitor manufactured in Example 1 and Murata's multilayered ceramic capacitor X7R, respectively.

Experimental Example 2: Measurement of
Equivalent Series Resistance (ESR) Against
Frequency The equivalent series resistance versus frequency for the multilayered ceramic capacitor (=AMO) manufactured in Example 1 and Murata's multilayered ceramic capacitor X7R (=MURATA) was measured, and the measurement graph therefrom is shown in FIG. 2. Referring to FIG. 2, it was confirmed that the multilayered ceramic capacitor manufactured in Example 1 had a lower equivalent series resistance than that of Murata's multilayered ceramic capacitor X7R.

Experimental Example 3: Measurement of Quality
Factor (Q) for Frequency

Figure 3:
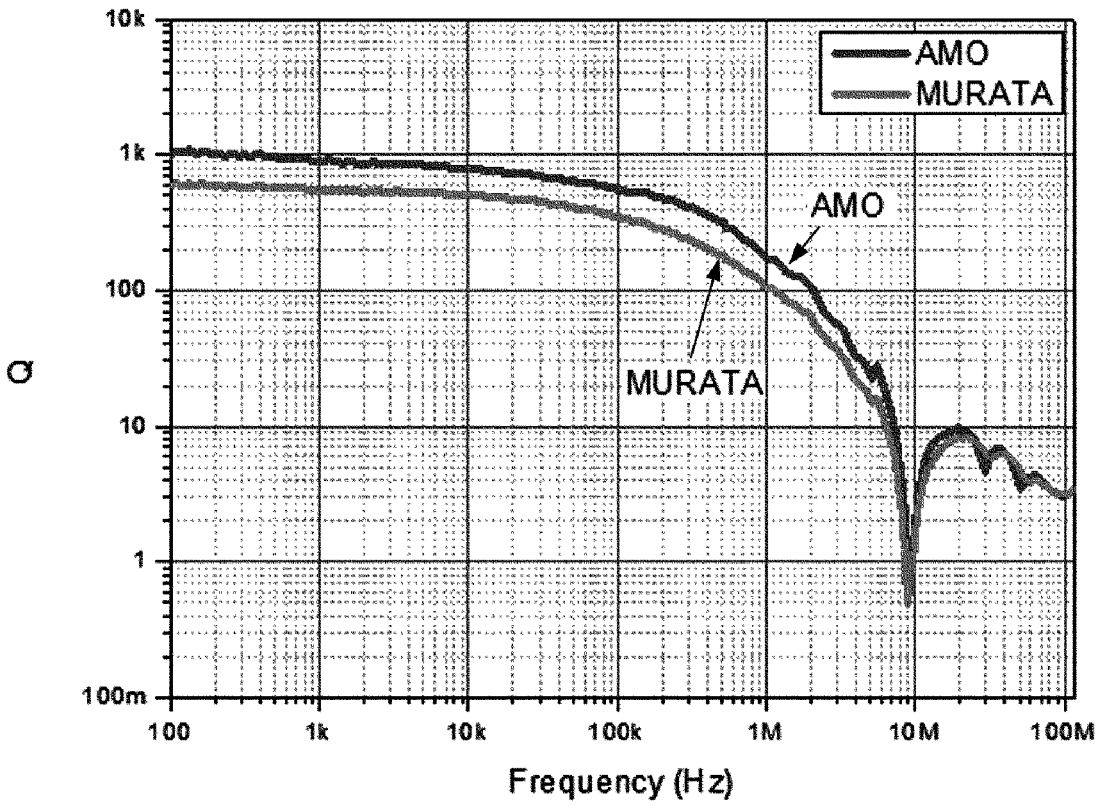
FIG. 3 is a graph showing the quality factor versus frequency for the multilayered ceramic capacitor manufactured in Example 1 and Murata's multilayered ceramic capacitor X7R, respectively.

The quality coefficients for the multilayered ceramic capacitor (=AMO) manufactured in Example 1 and Murata's multilayered ceramic capacitor X7R (=MURATA) were measured, and the measurement graph therefrom is shown in FIG. 3. Referring to FIG. 3, it could be confirmed that the multilayered ceramic capacitor manufactured in Example 1 had a higher quality factor value than Murata's multilayered ceramic capacitor X7R.

Figure 4:
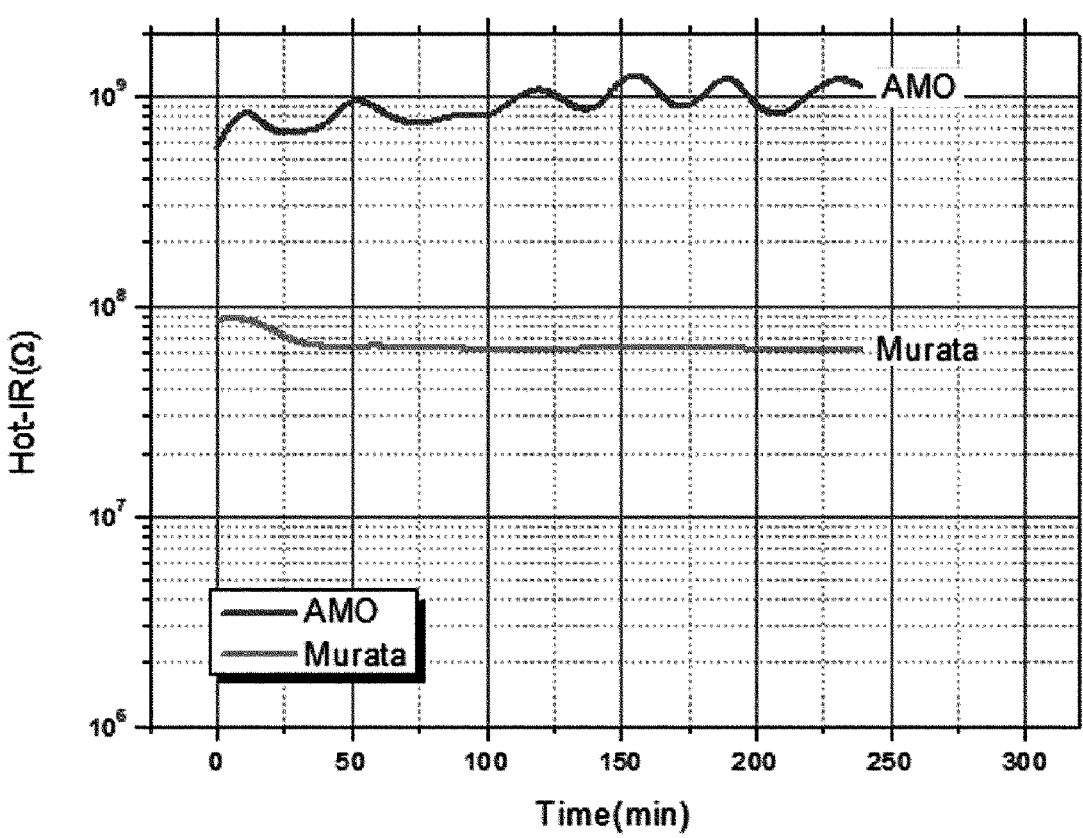
FIG. 4 is a graph showing the DC insulation resistance versus time at a high temperature of 150° C. for the multilayered ceramic capacitor manufactured in Example 1 and Murata's multilayered ceramic capacitor X7R, respectively.

Experimental Example 4: Measurement of DC
Insulation Resistance (Hot-IR) Versus Time at High
Temperature The multilayered ceramic capacitor (=AMO) manufactured in Example 1 and Murata's multilayered ceramic capacitor X7R (=MURATA) were measured for DC insulation resistance versus time at a high temperature of 150° C., and the measurement graph therefrom is shown in FIG. 4. Referring to FIG. 4, it could be confirmed that the multilayered ceramic capacitor manufactured in Example 1 had a higher DC insulation resistance than Murata's multilayered ceramic capacitor X7R, and thus had excellent reliability.

Figure 5:
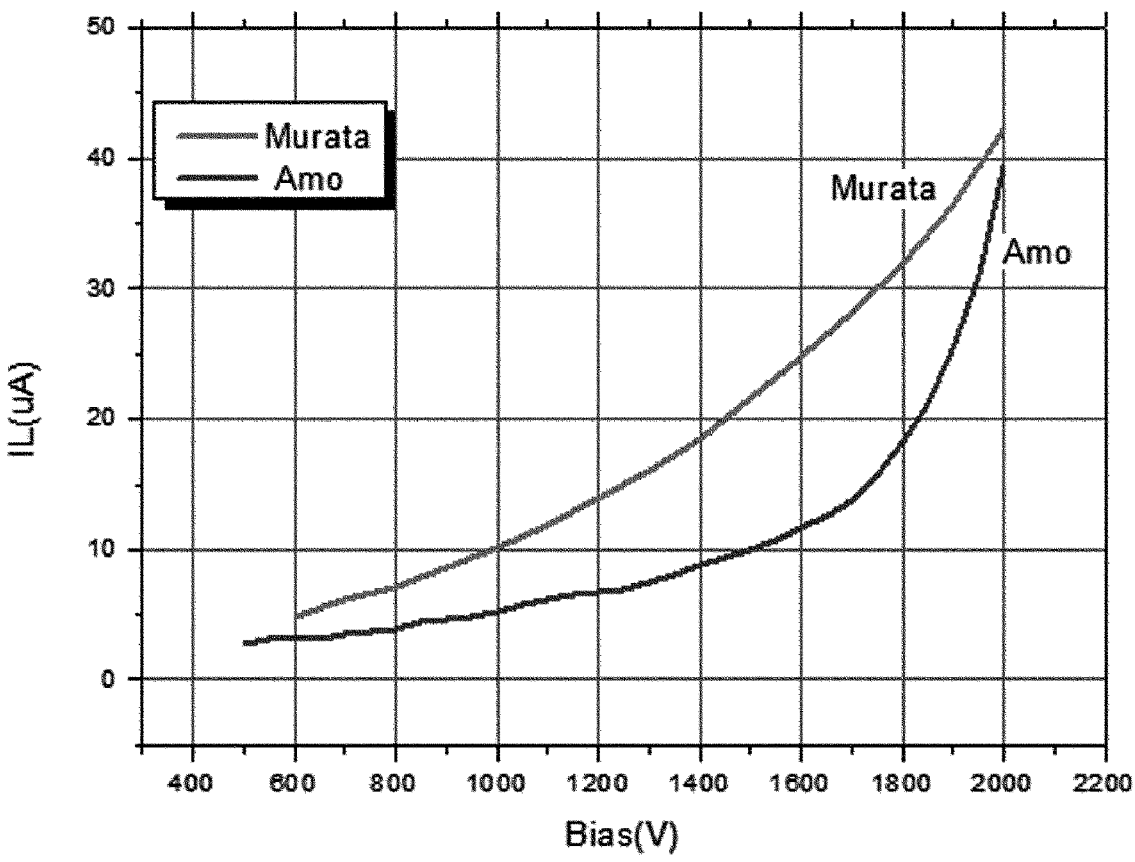
FIG. 5 is a graph showing the leakage current versus voltage at a high temperature of 150° C. for the multilayered ceramic capacitor manufactured in Example 1 and Murata's multilayered ceramic capacitor X7R.

Experimental Example 5: Measurement of Leakage
Current (IL) Versus Voltage at High Temperature The leakage current versus the voltage at a high temperature of 150° C. was measured for the multilayered ceramic capacitor (=AMO) manufactured in Example 1 and Murata's multilayered ceramic capacitor X7R (=MURATA), and the measurement graph therefrom is shown in FIG. 5. Referring to FIG. 5, it could be confirmed that the multilayered ceramic capacitor manufactured in Example 1 showed a lower leakage current than Murata's multilayered ceramic capacitor X7R, and thus had excellent reliability.

Figure 6:
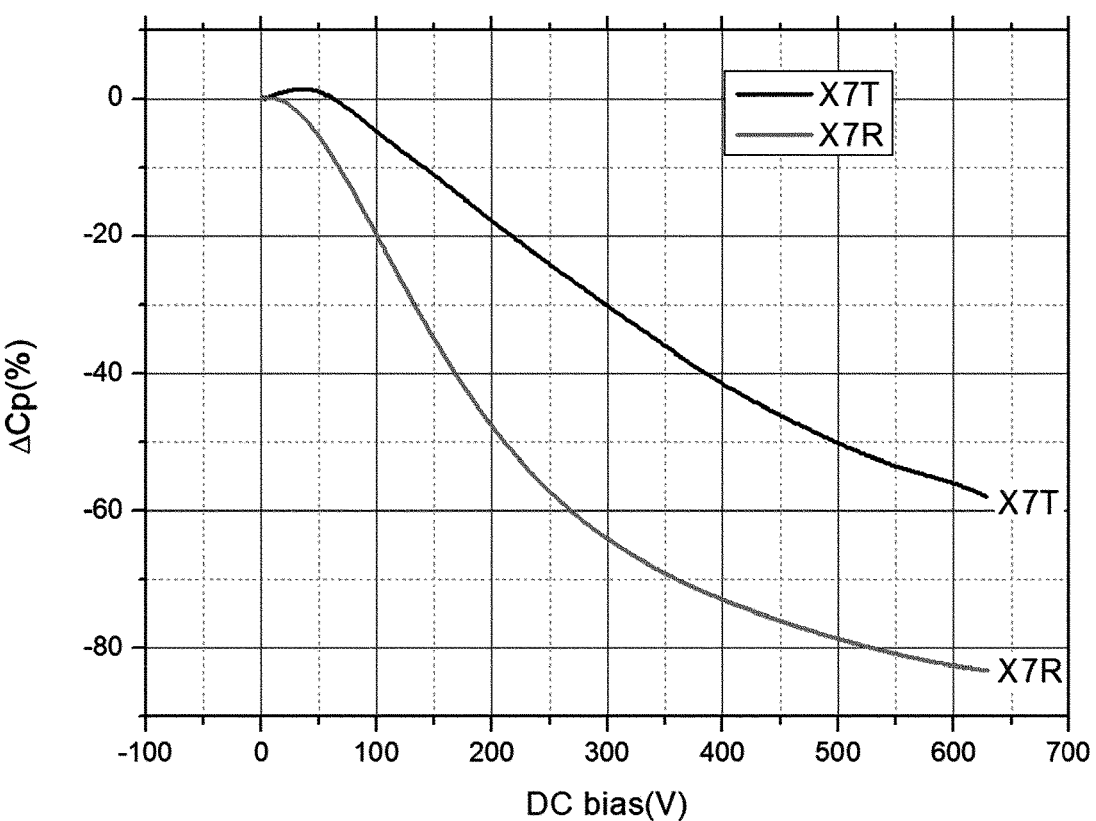
FIG. 6 is a graph showing a change in capacitance generated by terminals with respect to an increase in DC bias voltage for the multilayered ceramic capacitor manufactured in Example 1 and Murata's multilayered ceramic capacitor X7R, respectively.

Experimental Example 6: Measurement of Change
in Terminal Self-Generation Capacity (ΔCp) for DC
Bias The amount of change in capacitance generated by terminals with respect to an increase in DC bias voltage of the multilayered ceramic capacitor (=X7T) manufactured in Example 1 and Murata's multilayered ceramic capacitor X7R was measured, and the measurement graph therefrom is shown in FIG. 6. Referring to FIG. 6, it could be confirmed that the multilayered ceramic capacitor manufactured in Example 1 had more excellent DC bias characteristics than Murata's multilayered ceramic capacitor X7R.

Although one exemplary embodiment of the present invention has been described above, the spirit of the present invention is not limited to the exemplary embodiments presented herein, and those skilled in the art who understand the spirit of the present invention may easily suggest other exemplary embodiments by changing, modifying, deleting or adding components within the scope of the same spirit, but this will also fall within the scope of the present invention.

INDUSTRIAL APPLICABILITY

The present invention relates to a dielectric composition for a multilayered ceramic capacitor, a multilayered ceramic capacitor including the same and a manufacturing method thereof, and more specifically to a dielectric composition for a multilayered ceramic capacitor having excellent reliability and performance, a multilayered ceramic capacitor including the same and a manufacturing method thereof.

What is claimed is:
1. A dielectric composition for a multilayered ceramic capacitor, comprising:
a barium-based compound, $Gd_2O_3$, $Mn_3O_4$ and $MgCO_3$, wherein the barium-based compound comprises $BaZrO_3$ and $BaTiO_3$, wherein the barium-based compound comprises $BaZrO_3$ and $BaTiO_3$ at a molar ratio of 1:2 to 6, and wherein the dielectric composition comprises 2 to 6 mole parts of $Gd_2O_3$, 0.01 to 1 mole part of $Mn_3O_4$ powder and 2 to 6 mole parts of $MgCO_3$, based on 100 mole parts of the barium-based compound.
2. The dielectric composition according to claim 1, wherein the dielectric composition satisfies conditions (1) to (3) below:

$$D10 \le 60 \, \text{nm} \tag{1}$$

$$150 \, \text{nm} \le D50 \le 350 \, \text{nm} \tag{2}$$

$$D90 \le 2{,}000 \, \text{nm} \tag{3}$$

wherein in the conditions (1) to (3) above, D10, D50 and D90 refer to particle sizes corresponding to 10%, 50% and 90% of a maximum value in a volumetric distribution of the dielectric composition particle size, respectively.
3. A multilayered ceramic capacitor, comprising:
a capacitor body, wherein a ceramic body and internal electrodes are alternately stacked in the capacitor body, wherein the dielectric composition according to claim 1 is sintered in the ceramic body; and
external electrodes, wherein the external electrodes are formed on an outer surface of the capacitor body and electrically connected to the internal electrodes.
4. A method for manufacturing a multilayered ceramic capacitor, comprising:
1) preparing a dielectric composition for a multilayered ceramic capacitor according to claim 1;
2) preparing a ceramic slurry by mixing the dielectric composition with a binder and an organic solvent;
3) forming a ceramic green sheet by casting the ceramic slurry;
4) manufacturing a green chip by printing internal electrodes on one surface of the ceramic green sheet and stacking a plurality of ceramic green sheets the same;

5) manufacturing a capacitor body by performing a debinding process and a sintering process on the green chip; and 6) manufacturing a multilayered ceramic capacitor by printing external electrodes electrically connected to the internal electrodes on an external surface of the capacitor body.

5. The method according to claim 4, wherein in step 2), the dielectric composition is mixed with a binder and an organic solvent, pulverized and subjected to a defoamation process and an aging process to prepare the ceramic slurry, wherein the ceramic slurry satisfies conditions (1) to (3) below and has a viscosity of 100 to 500 cps:

$$D10 \leq 60 \text{ nm} \tag{1}$$

$$150 \text{ nm} \leq D50 \leq 350 \text{ nm} \tag{2}$$

$$D90 \leq 2,000 \text{ nm} \tag{3}$$

wherein in the conditions (1) to (3) above, D10, D50 and D90 refer to particle sizes corresponding to 10%, 50% and 90% of a maximum value in a volumetric distribution of the dielectric composition particle size, respectively.

6. The method according to claim 4, wherein the binder comprises at least one selected from polyvinyl butyral, ethyl cellulose, polyvinyl alcohol and acryl.

\* \* \* \* \*